(12) United States Patent
Jang

(10) Patent No.: US 7,458,546 B2
(45) Date of Patent: Dec. 2, 2008

(54) MONITOR STAND

(75) Inventor: Woon Geun Jang, Daegoo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/702,160

(22) Filed: Feb. 5, 2007

(65) Prior Publication Data

US 2007/0278364 A1 Dec. 6, 2007

(30) Foreign Application Priority Data

Jun. 1, 2006 (KR) ........................ 10-2006-0049416

(51) Int. Cl.
*F16M 11/00* (2006.01)
(52) U.S. Cl. ........................ 248/161; 248/404; 248/919; 361/682
(58) Field of Classification Search ................. 248/161, 248/132, 162.1, 404, 414, 407, 408, 919; 361/681, 682
See application file for complete search history.

(56) References Cited

U.S. PATENT DOCUMENTS

| | | | |
|---|---|---|---|
| 6,061,104 A | 5/2000 | Evanicky et al. | |
| 6,279,860 B1 * | 8/2001 | Swanger | 248/125.2 |
| 6,450,462 B1 * | 9/2002 | Hsieh | 248/125.1 |
| 6,659,417 B2 * | 12/2003 | Hsieh | 248/404 |
| 7,124,984 B2 * | 10/2006 | Yokouchi et al. | 248/125.8 |
| 2005/0236533 A1 * | 10/2005 | McRight et al. | 248/161 |
| 2007/0145203 A1 * | 6/2007 | Takada et al. | 248/162.1 |

FOREIGN PATENT DOCUMENTS

| | | |
|---|---|---|
| JP | 2004-029953 | 1/2004 |
| JP | 2005300922 | * 10/2005 |
| KR | 20-2000-0001380 | 1/2000 |
| KR | 10-2003-0058204 | 7/2003 |
| WO | WO-2005-064436 | 7/2005 |

* cited by examiner

*Primary Examiner*—Ramon O Ramirez
(74) *Attorney, Agent, or Firm*—Birch, Stewart, Kolasch & Birch, LLP

(57) ABSTRACT

Provided is a monitor stand, capable of preventing an "auto-lift" phenomenon that occurs when a monitor installed thereon is tilted past a predetermined angle, due to a shift in the monitor's weight. The monitor stand includes a base, a stand body, a stand top, a stop slide, a first elastic member, and a one-way clutch assembly. The stand body is supported by the base. The stand top is pivotably supported on the stand body. The top slide slides along the stand top, has a rack extending in a sliding direction fixed thereto, and has a monitor installed thereon. The first elastic member is supported by the stand top, to impart elasticity in an upward direction to the top slide. The one-way clutch assembly is capable of engaging and disengaging to and from the rack, to prevent the rack from rising when engaged to the rack.

10 Claims, 6 Drawing Sheets

MONITOR STAND

BACKGROUND OF THE INVENTION

1. Field of the Invention

The present invention relates to a stand for supporting a monitor, and more particularly, to a monitor stand with tilt and height adjustment, and capable of preventing an "auto lift up" phenomenon that occurs when the monitor is tilted past a predetermined angle, due to a change in acting direction of the monitor's weight.

2. Description of the Related Art

Generally, flat panel monitors such as liquid crystal display (LCD) devices require stands for supporting the monitors on a desk or table for use. Such stands have a hinge assembly interposed between the rear of the monitor and the stand to allow a user to adjust the monitor to a desired angle.

Recently, monitor stands have been developed to adjust not only the tilt angle, but also the height of the monitor, for added convenience.

Referring to FIG. 1, a monitor stand according to the related art will be described in detail.

As shown in FIGS. 1 and 2, a monitor stand according to the related art includes a stand top 4 installed to raise and lower the monitor 1, a stand body 2 pivotably supporting the stand top 4, and a base 3 for supporting the stand body 2 on a desk or other flat surface.

When a user grasps the upper or lower portion of the monitor 1 and pulls it forward, the stand top 4 pivots about the upper hinge 5 to adjust the tilt angle of the monitor 1.

In order to support the monitor 1, a spiral spring (not shown) that provides an elastic force in an upward direction equal to the weight W of the monitor 1, is provided inside the stand top 4. The spiral spring provides a uniform elastic force F to support the monitor 1 in an upward direction, regardless of its deformed state.

Accordingly, after the user moves the monitor 1 upwards or downwards with respect to the stand 4 and releases the force applied to the monitor 1, the monitor 1 maintains its current position due to the tension of the spiral spring (not shown) and the friction between components. Height adjusting of the monitor 1 is thus accomplished.

The lower portion of the stand body 2 is pivotably coupled to the base 3 with a lower hinge 6 interposed therebetween.

However, as shown in FIG. 2, in the above configuration of a monitor stand according to the related art, when a user pivots the monitor 1 to the rear, and the tilt angle exceeds a predetermined angle (30° from a vertical line, for example), the weight W of the monitor 1 is divided, so that the equilibrium between the tension F of the spiral spring and component of force W1 in a sliding direction of the monitor 1 is lost.

That is, when the monitor 1 has pivoted by an angle θ with respect to a vertical line, the component of force W1 of the monitor weight W1 is $W \cos \theta$, and becomes less than the tension F of the coil spring, so that when the difference exceeds the friction between the components, an auto lift up of the monitor 1 occurs. Therefore, an adjustment of the monitor to the height desired by the user does not occur. In severe cases, auto lift up of the monitor may cause it to collide with another object, causing a user unpleasantness.

SUMMARY OF THE INVENTION

Accordingly, the present invention is directed to a monitor stand that substantially obviates one or more problems due to limitations and disadvantages of the related art.

An object of the present invention is to provide a monitor stand that effectively prevents the auto lift up phenomenon of the monitor from occurring when the acting direction of the weight of monitor is changed due to tilting of the monitor installed on a stand beyond a predetermined angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a monitor stand including: a base; a stand body supported by the base; a stand top pivotably supported on the stand body; a top slide for sliding along the stand top, having a rack extending in a sliding direction fixed thereto, and having a monitor installed thereon; a first elastic member supported by the stand top, for imparting elasticity in an upward direction to the top slide; and a one-way clutch assembly capable of engaging and disengaging to and from the rack, for preventing the rack from rising when engaged to the rack.

The stand top may include a guide rail for guiding the sliding of the top slide, and the guide rail may include a guide pad installed at an inner side thereof.

The top slide may include a slide pad provided at a side edge thereof, for preventing wear due to friction from the sliding.

The first elastic member may be a spiral spring for maintaining the monitor at a same height through an elastic restoring force corresponding to a weight of the monitor.

The rack may be vertically installed on a side of the top slide in a length corresponding to a sliding distance of the top slide.

The one-way clutch assembly may include: a pinion capable of engaging to the rack; a shaft providing a center of rotation for the pinion; and a one-way clutch bearing interposed between the pinion and the shaft, for allowing the pinion to rotate only in one direction, wherein the stand top has a shaft guide formed therein for guiding a movement of the shaft.

The stand top may form an opening for allowing an entry of the pinion.

The one-way clutch assembly may further include a second elastic member for imparting elasticity to the shaft toward the rack, and the one-way clutch assembly may further include a pinion housing for supporting the shaft and containing the pinion within.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
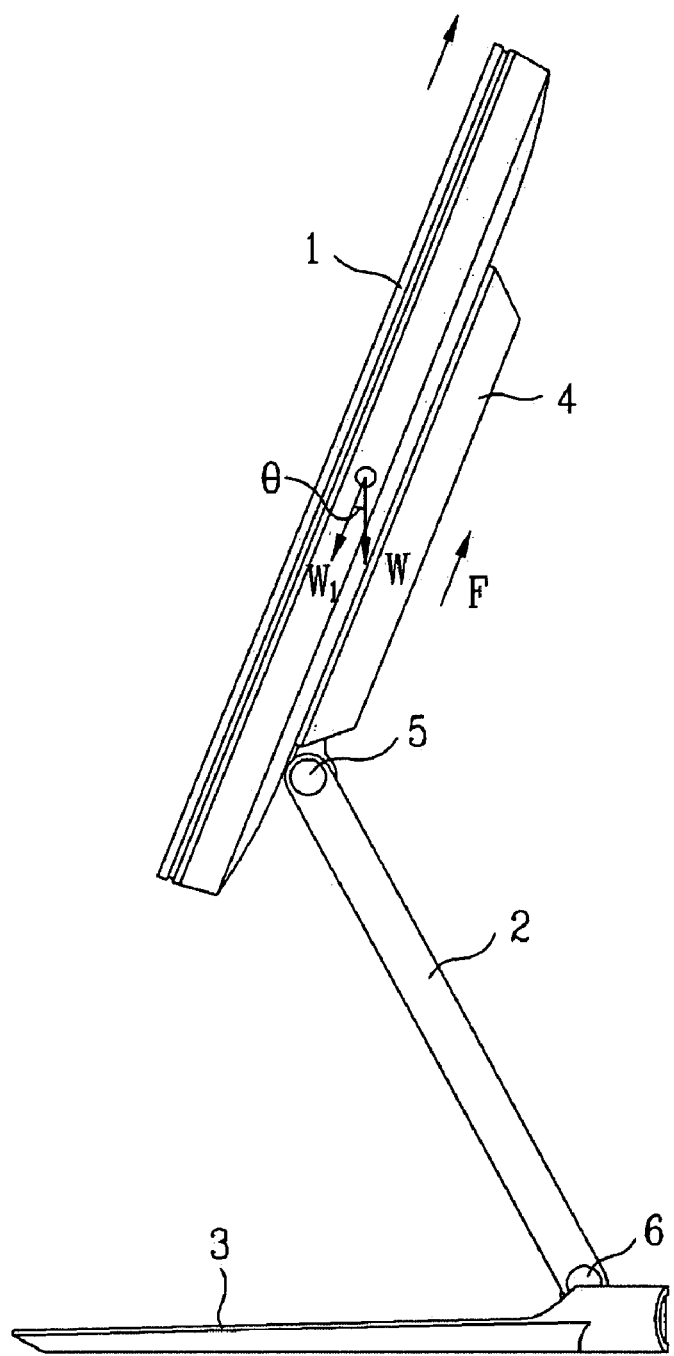
FIG. 1 is a side view of a monitor installed on a monitor stand according to the related art, where the (pivoting) angle of the monitor has been adjusted.
Figure 2:
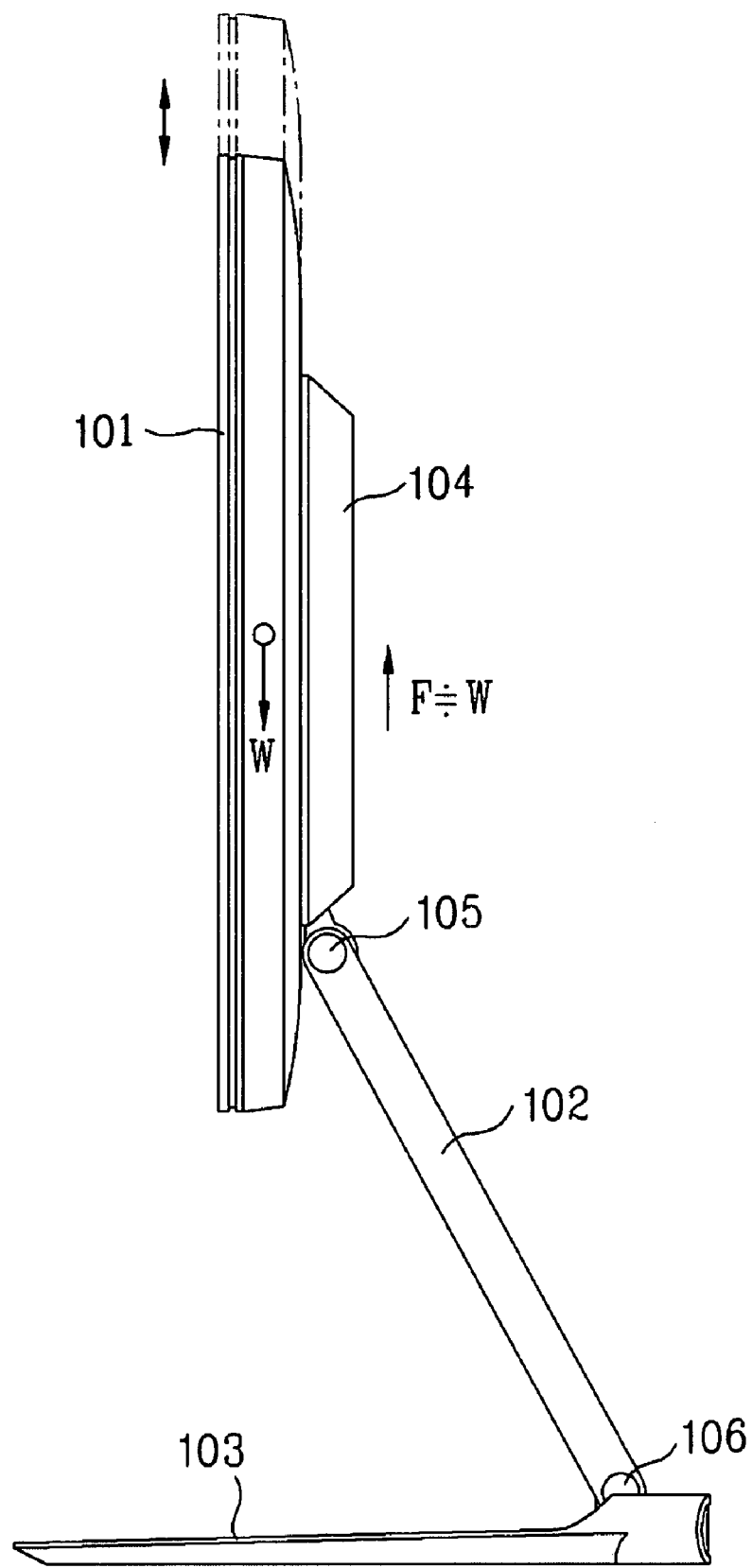
FIG. 2 is a side view of a monitor installed on a monitor stand.

Reference will now be made in detail to the preferred embodiments of the present invention, examples of which are illustrated in the accompanying drawings. Wherever possible, the same reference numbers will be used throughout the drawings to refer to the same or like parts.

Below, a detailed description of preferred embodiments according to the present invention will be given with reference to FIGS. 2 through 6. As shown in the drawings, the monitor stand according to the present invention includes a base 103, a stand body 102, and a stand top assembly 104. The stand top assembly 104 includes a stand top 10, a top slide 20, a first elastic member 30, and a one-way clutch assembly 40.

The stand body 102 pivotably supports the stand top assembly 104, and the stand top assembly 104 slidably supports the top slide 20. The stand body 102 is pivotably supported by a lower hinge assembly 106 that includes a pivoting shaft (not shown) and a torsion spring (not shown). The torsion spring imparts an elasticity that allows the stand body 102 to retain an adjusted position with respect to a resting surface of the monitor stand. Depending on need, a washer (not shown) may be further added to the lower hinge assembly 106. The stand body 102 may be fixed to the base 103 so that it cannot rotate, and the lower hinge assembly 106 is not a necessary feature of the present invention. The base 103 rests on a flat surface such as a desk.

The stand top assembly 104 according to the present embodiment is assembled from a separately formed stand top 10 and a stand top supporter (not shown); however, it may be formed as a single piece. The stand top supporter is pivotably supported on the upper portion of the stand body 102 by means of an upper hinge assembly 105, and is fastened to the bottom end of the stand top 10 shown in FIG. 3.

The upper hinge assembly 105 may include a rotating shaft (not shown) that pivotably connects the stand body 102 to the stand top assembly 104, and a torque generator that provides a force opposing the weight of the monitor 101, so that the stand top assembly 104 on which the monitor 101 is installed can maintain a position after it is adjusted to a predetermined angle. The torque generator may be formed using a torsion spring.

A top slide 20 is supported by a first elastic member 30 and guided along a guide rail 12 of the stand top 10. The monitor 101 may be directly fixed to an installing panel 22 of the stand top 10, or may be fixed to the stand top 10 with a separate head mount (not shown) interposed therebetween.

Figure 3:
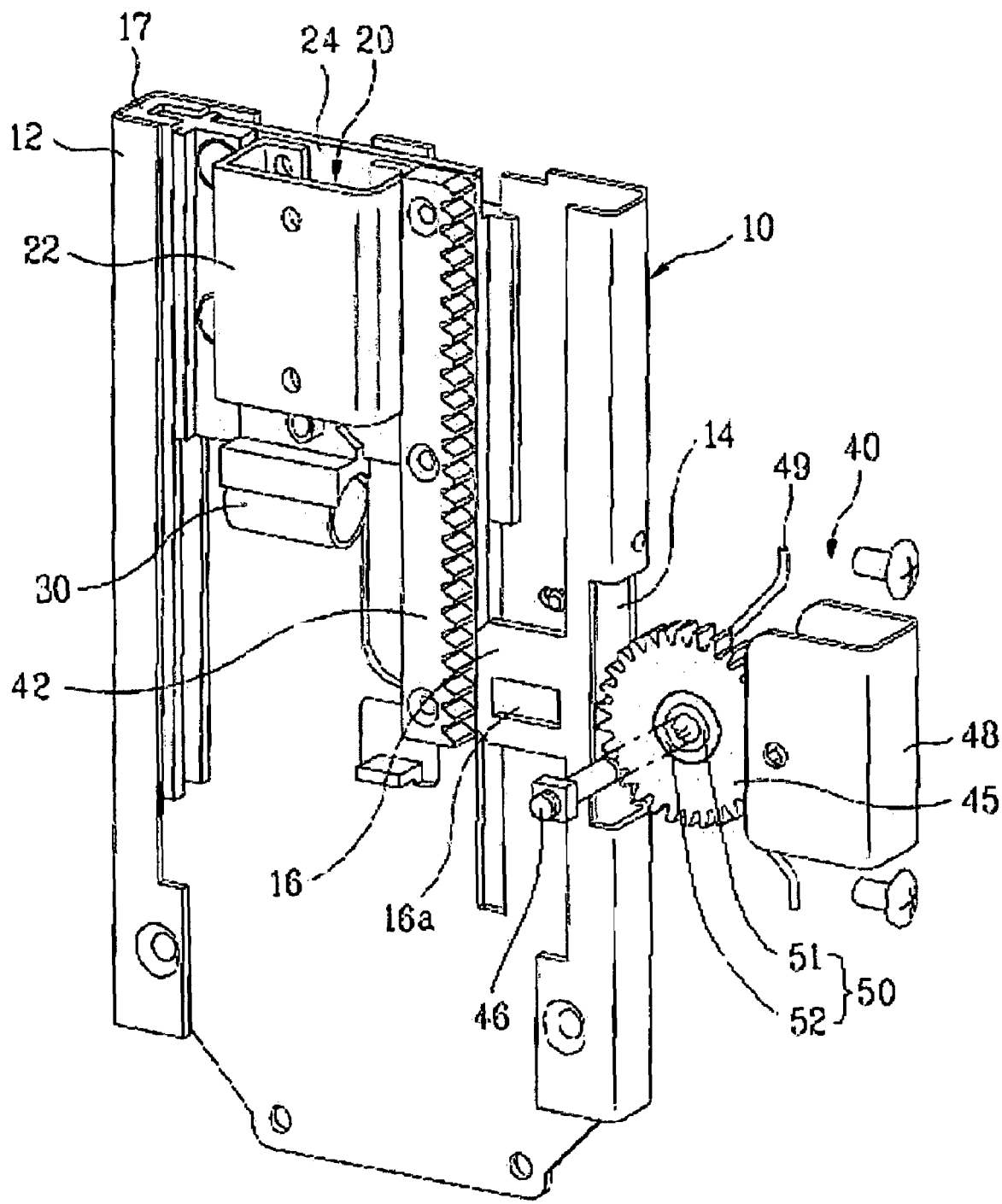
FIG. 3 is a perspective view of a stand top of a monitor stand and related components according to the present invention.
Figure 4:
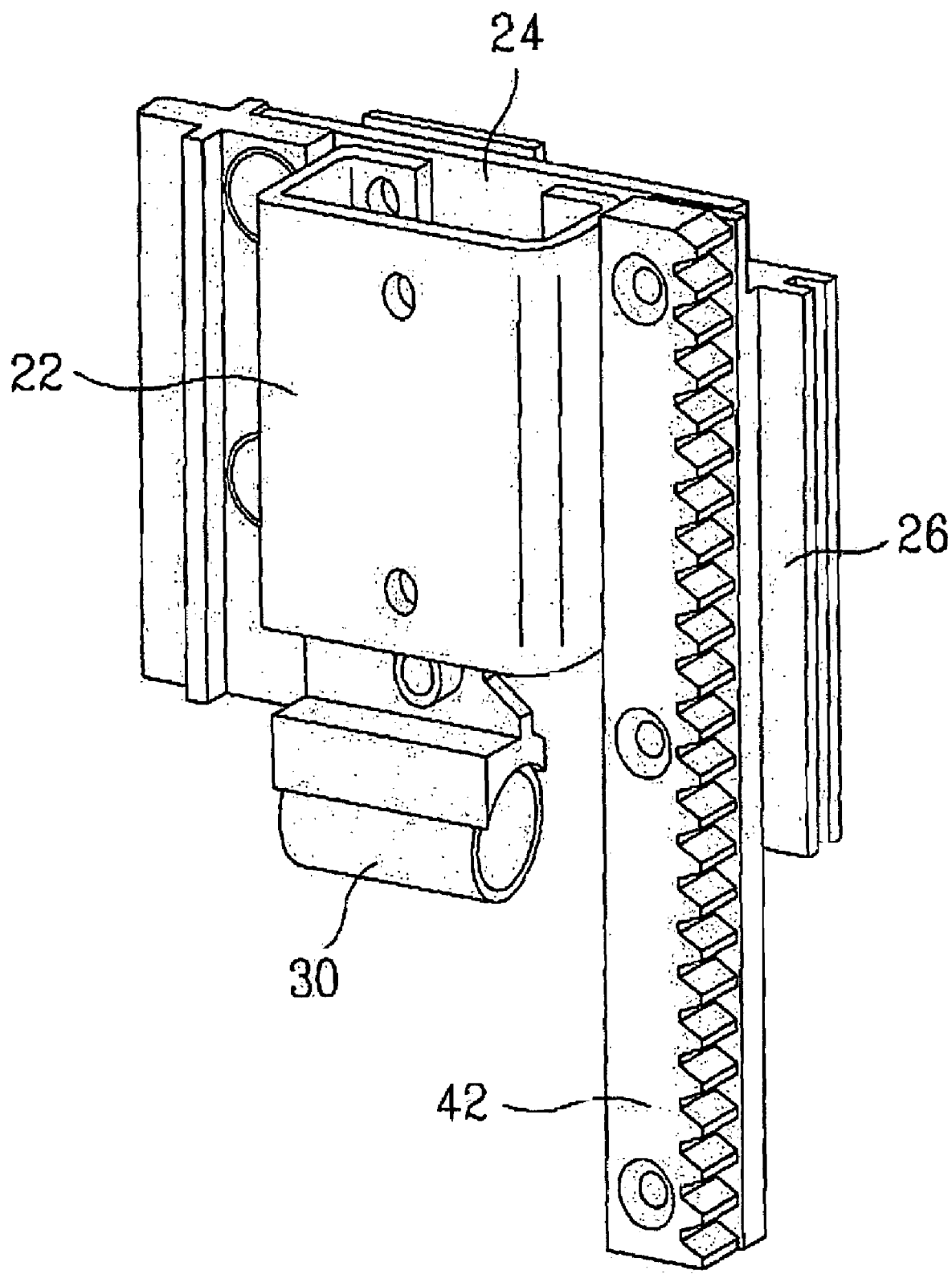
FIG. 4 is a detailed perspective view of a top slide from components of a monitor stand according to the present invention.
Figure 5:
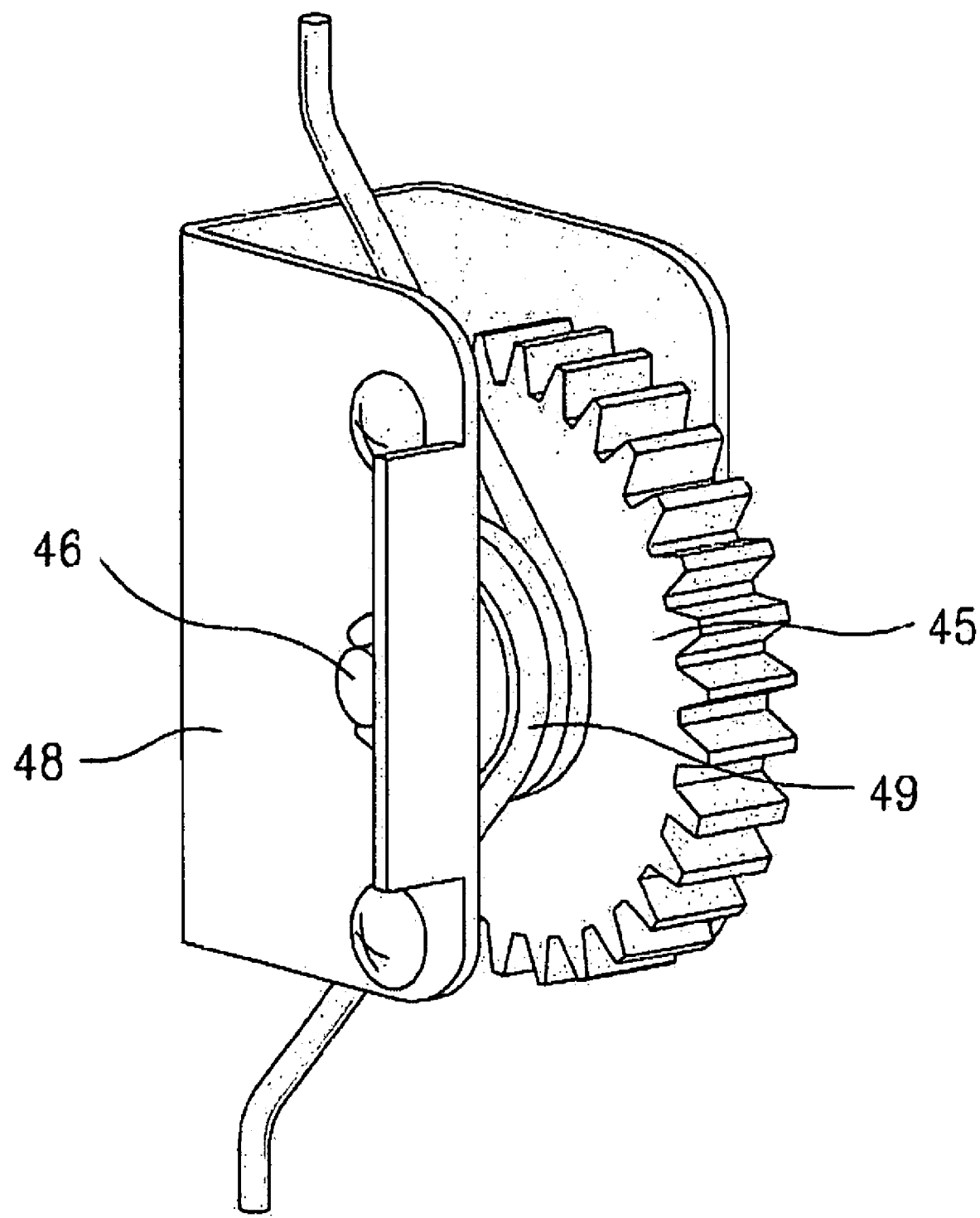
FIG. 5 is a perspective view of a pinion and related parts from components of a monitor stand according to the present invention.
Figure 6:
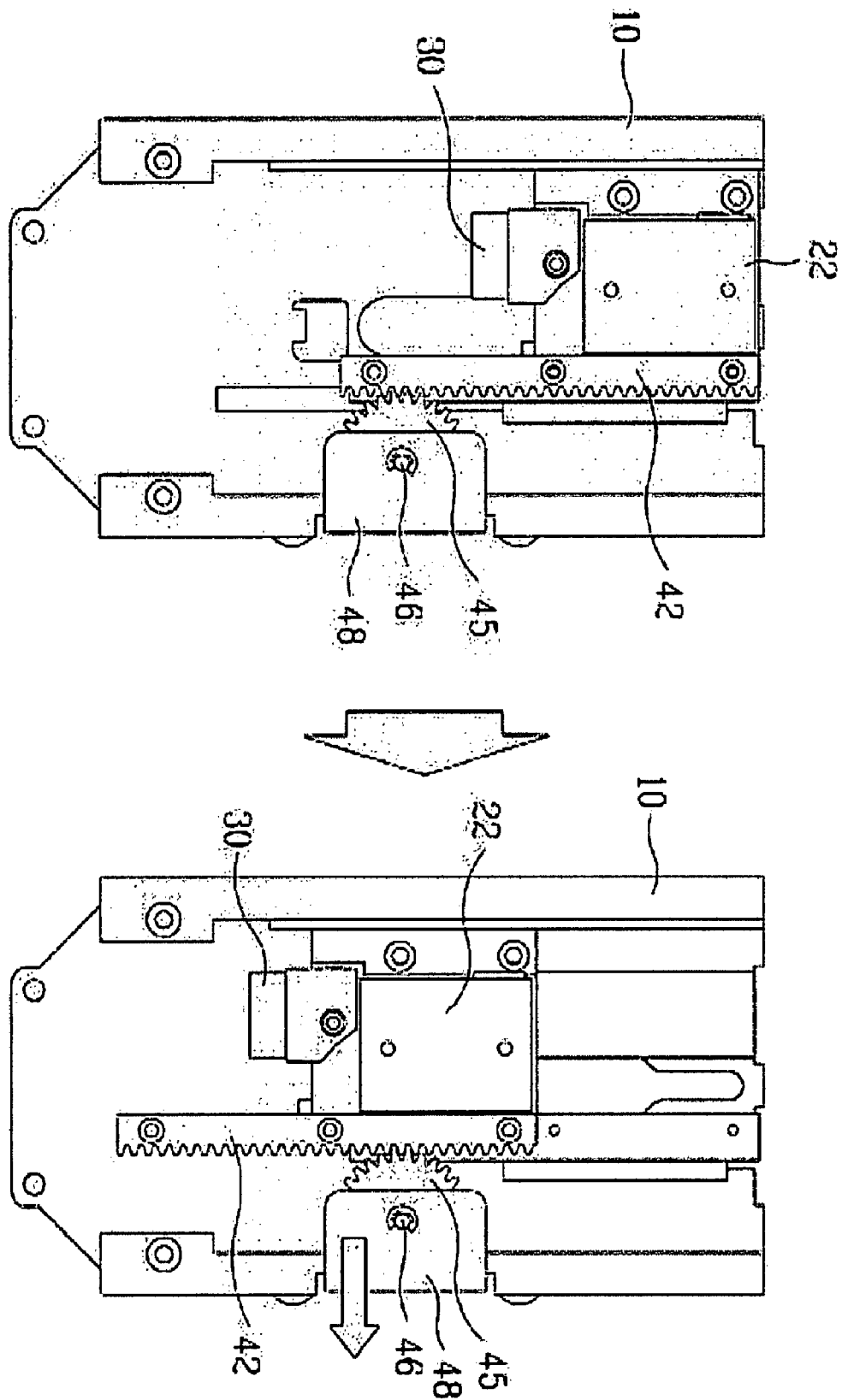
FIG. 6 is a plan view showing the monitor stand according to the present invention in operation.

The first elastic member 30 has one end fixed to the stand top 10 and the other end fixed to the top slide 20, to provide elasticity to the top slide 20 in an upward direction. The elasticity counteracts the weight of the monitor to maintain a position of the monitor 101 adjusted by a user. The first elastic member 30 may be a spiral spring, as shown in FIG. 3.

When a user moves the monitor 101 in a vertical direction, the top slide 20 moves vertically along the guide rail 12 of the stand top 10, so that the height of the monitor 101 is adjusted. The guide rail 12 is formed either by bending both sides of the stand top 10 or attaching separate pieces. Also, an opening 14 for the passage of a pinion 45 is formed in the structure on the opposite side of the guide rail 12 shown in FIG. 3.

A shaft guide 16 is formed near the opening 14. A through-hole 16a is formed at the center of the shaft guide 16, through which a shaft 46 to be described below passes. The shaft 46 is guided in the through-hole 16a to get close to or away from the rack 42.

A guide pad 17 may further be provided to the inside of the guide rail 12. The guide pad 17 may be formed of a compound resin to prevent noise generated from friction, and forms a slot (not shown) of a predetermined depth along a length thereof.

When the guide pad 17 is used, the top slide 20 is slidably installed thereon. The top slide 20 includes the installing panel 22 on which the monitor 101 is installed, a slide panel 24 to which the installing panel 22 is fixed, and a slide pad 26.

The installing panel 22 is formed by bending either side of a flat panel and being fixed to the sliding panel 24.

The slide pad 26 is either inserted and fixed in either end of the slide panel 24 or formed integrally with the slide panel 24, and is slidably inserted in the stand top 10.

The first elastic member 30 may be a spiral spring, where the rolled portion thereof that winds and unwinds repeatedly is installed at the lower portion of the slide panel 24.

The top slide 20 has a rack 42 vertically installed thereon, and a one-way clutch assembly 40 is installed on the stand top 10. The one-way clutch assembly 40 prevents the occurrence of the auto lift phenomenon of the top slide 20 according to the change in acting direction of the weight of monitor.

The one-way clutch assembly 40 includes a pinion 45, a shaft 46, and a one-way clutch bearing 50, and further includes a second elastic member 49 and a pinion housing 48.

The pinion 45 includes teeth that engage to teeth of the rack 42, and is rotatably and slidably supported by the shaft 46 and the shaft guide 16. The shaft guide 16 permits horizontal movement of the shaft 46.

A one-way clutch bearing 50 is interposed between the pinion 45 and the shaft 46 to enable the pinion 45 to rotate only in one direction. The one-way clutch bearing 50 includes an inner portion 51 fixed to the shaft 46 and an outer portion 52 fixed to the pinion 45. The inner portion 51 and outer portion 52 are able to turn in one direction only against one another. FIG. 3 shows the outer portion 52 able to turn against the inner portion 51 only in a counterclockwise direction.

The second elastic member 49 provides the shaft 46 with elasticity towards the rack 42. The second elastic member 49 has a center portion wound about the center of the shaft 46 and end portions supported by the stand top 10 in this embodiment. The second elastic member 49 engages the pinion 45 back with the rack 42 when an outer force that is exerted to separate the pinion 45 from the rack 42 is removed.

The pinion housing 48 supports the shaft 46 and encloses the pinion 45 within. The pinion housing 48 is useful for a user to grasp when separating the pinion 45 from the rack 42.

The shaft 46 passes through the through-hole 16a, with the pinion 45 having the one-way clutch bearing 50 thereon disposed at the inside of the stand top, and inserts into the inner portion 51 of the one-way clutch bearing.

To describe the operation of the above structured monitor stand according to the present invention, a description will first be given of the height adjusting operation of the monitor 101.

When a user grasps the monitor 101 and exerts force in a downward direction, the top slide 20 slides downward along the guide rail 12 of the stand top 10. Here, when the user positions the monitor at a desired height and lets go, the elasticity of the spiral spring 30 opposing the weight of the monitor 101 and the friction between the contacting components maintain the height of the monitor 101 at that level. Here, the rack 42 and pinion 45 are in an engaged position.

On the other hand, when the user raises the monitor, the user first pulls the pinion housing 48 to disengage the pinion 45 from the rack 42 in order to raise the monitor. After the monitor is raised to a desired level, the user may release the pinion 48. Here, the elasticity imparted by the second elastic member 49 re-engages the pinion 45 to the rack 42. Here, the pinion 45 is held by the one-way clutch bearing 50, so that when engaged to the rack 42, the pinion 45 rotates only when the rack 42 moves in a downward direction, and not in an upward direction.

When the rack 42 and pinion 45 are thus engaged, the rack 42 cannot be raised, so that auto lift up does not occur when a user tilts the monitor at an excessive angle (that causes the weight separation W1 of the monitor and counteracting elasticity to lose equilibrium, as shown in FIG. 1).

Thus, a user may tilt the monitor to a desired angle, and the problem of damage incurred by auto lift up can also be obviated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A monitor stand comprising:
   a base;
   a stand body supported by the base;
   a stand top pivotably supported on the stand body;
   a top slide for sliding along the stand top, having a rack extending in a sliding direction fixed thereto, and having a monitor installed thereon;
   a first elastic member supported by the stand top, for imparting elasticity in an upward direction to the top slide; and
   a one-way clutch assembly having a pinion capable of engaging to the rack and a one-way clutch bearing provided to the pinion for allowing the pinion to rotate only in one direction when engaged to the rack.

2. The monitor stand according to claim 1, wherein the stand top includes a guide rail for guiding the sliding of the top slide.

3. The monitor stand according to claim 2, wherein a guide pad is installed at an inner side of the guide rail.

4. The monitor stand according to claim 1, wherein a slide pad for preventing wear due to friction from the sliding is provided at a side edge of the top slide.

5. The monitor stand according to claim 1, wherein the first elastic member is a spiral spring applying an elastic restoring force corresponding to a weight of the monitor.

6. The monitor stand according to claim 1, wherein the rack is vertically installed on a side of the top slide and has a length corresponding to a sliding distance of the top slide.

7. The monitor stand according to claim 1, wherein the one-way clutch assembly includes:
   a shaft providing a center of rotation for the pinion; and
   a shaft guide formed to the stand for guiding a movement of the shaft.

8. The monitor stand according to claim 7, wherein an opening for allowing an entry of the pinion is formed in the stand top.

9. The monitor stand according to claim 7, wherein the one-way clutch assembly further includes a second elastic member for imparting elasticity to the shaft toward the rack.

10. The monitor stand according to claim 7, wherein the one-way clutch assembly further includes a pinion housing for supporting the shaft and containing the pinion within.

* * * * *